(12) United States Patent
McHugh et al.

(10) Patent No.: US 10,146,220 B2
(45) Date of Patent: Dec. 4, 2018

(54) SYSTEM FOR, AND A METHOD OF, CONTROLLING OPERATION OF A VEHICLE IN A DEFINED AREA

(71) Applicant: Technological Resources Pty Ltd, Brisbane, QLD (AU)

(72) Inventors: Charles Benjamin McHugh, Brisbane (AU); Eric William Nettleton, Brisbane (AU); Florian Oppolzer, Brisbane (AU)

(73) Assignee: Technological Resources Pty Ltd., Melbourne (AU)

( * ) Notice: Subject to any disclaimer, the term of this patent is extended or adjusted under 35 U.S.C. 154(b) by 320 days.

(21) Appl. No.: 14/024,716

(22) Filed: Sep. 12, 2013

(65) Prior Publication Data

US 2014/0074319 A1    Mar. 13, 2014

(30) Foreign Application Priority Data

Sep. 13, 2012 (AU) .................................. 2012904004

(51) Int. Cl.
| | |
|---|---|
| G05D 1/00 | (2006.01) |
| G06F 7/00 | (2006.01) |
| G05D 1/02 | (2006.01) |

(52) U.S. Cl.
CPC ......... G05D 1/0044 (2013.01); G05D 1/0038 (2013.01); G05D 1/0061 (2013.01);
(Continued)

(58) Field of Classification Search
CPC ...... G05D 1/00; G05D 1/0214; G05D 1/0044; G05D 1/0061
(Continued)

(56) References Cited

U.S. PATENT DOCUMENTS

| | | |
|---|---|---|
| 5,774,069 A | 6/1998 | Tanaka et al. |
| 6,226,592 B1 | 5/2001 | Luckscheiter et al. |

(Continued)

OTHER PUBLICATIONS

Australian Patent Office International-Type Search Report for Australian National Application No. 2012904004 dated Oct. 11, 2012.
Dec. 18, 2017—(AU)—Examination Report No. 3—App 2013227999.

*Primary Examiner* — Aaron L Troost
(74) *Attorney, Agent, or Firm* — Banner & Witcoff, Ltd.

(57) ABSTRACT

A system 10 for controlling operation of a vehicle 12 in a defined area 14 includes a perimeter 16 defining a boundary of the defined area 14. A user interface 18 is provided for at least one of controlling and monitoring movement of the vehicle 12 as it traverses the area 14 and monitoring the location of the vehicle 12 relative to the perimeter 16. The system 10 further includes a controller 26 to which the vehicle 12 is responsive, the vehicle 12 having a plurality of modes of operation, one of which is an autonomous mode and another of which is an operator controlled mode. The controller 26 is operative, when the vehicle 12 is operating in the autonomous mode and the vehicle comes within a predetermined range of the perimeter, to inhibit the vehicle 12 from crossing the perimeter 16 and, when the vehicle 12 is operating in the operator controlled mode or is converted from autonomous mode to operator controlled mode, to permit the vehicle 12 to cross the perimeter 16 under control of the operator.

22 Claims, 4 Drawing Sheets

(52) U.S. Cl.
CPC ......... *G05D 1/0088* (2013.01); *G05D 1/0278* (2013.01); *G06F 7/00* (2013.01); *G05D 2201/021* (2013.01)

(58) Field of Classification Search
USPC ...................................................... 701/2, 50
See application file for complete search history.

(56) References Cited

U.S. PATENT DOCUMENTS

| | | |
|---|---|---|
| 6,718,235 B1 | 4/2004 | Borugian |
| 7,480,569 B2 | 1/2009 | Wehrlen et al. |
| 8,477,021 B2 * | 7/2013 | Slack ..................... B60Q 9/008 340/435 |
| 2006/0195237 A1 | 8/2006 | Makela |
| 2009/0043462 A1 * | 2/2009 | Stratton ................... E02F 9/26 701/50 |
| 2009/0140886 A1 | 6/2009 | Bender |
| 2009/0326734 A1 * | 12/2009 | Gudat .................. E02F 9/2054 701/2 |
| 2011/0153541 A1 | 6/2011 | Koch et al. |
| 2011/0288727 A1 * | 11/2011 | Krautter .............. B62D 15/027 701/41 |
| 2011/0295423 A1 * | 12/2011 | Anderson ..................... 700/248 |
| 2012/0053775 A1 | 3/2012 | Nettleton et al. |
| 2012/0083964 A1 | 4/2012 | Montemerlo et al. |
| 2013/0304331 A1 * | 11/2013 | Braunstein .............. E02F 3/844 701/50 |
| 2014/0032132 A1 * | 1/2014 | Stratton ................... G06F 9/00 702/33 |

\* cited by examiner

SYSTEM FOR, AND A METHOD OF, CONTROLLING OPERATION OF A VEHICLE IN A DEFINED AREA

CROSS-REFERENCE TO RELATED APPLICATIONS

The present application claims priority from Australian Provisional Patent Application No 2012904004 filed on 13 Sep. 2012, the contents of which are incorporated by reference in this specification in their entirety.

FIELD

This disclosure relates, generally, to the control of vehicles and, more particularly, to a system for, and a method of, controlling operation of a vehicle in a defined area. The disclosure has particular, but not necessarily exclusive, application to mobile mining machinery.

BACKGROUND

One of the key tasks in open cut mining is the preparation of a drill bench and the drilling of blast holes in the bench. Accurate drilling of the blast holes is important and can have repercussions through downstream mining and processing operations. The accuracy of drilling impacts scheduling, excavation, slope stability, material handling, beneficiation, ore loss and final product blending.

The more accurately blast holes are drilled, the more effective the subsequent blasting operation will be. Poor blast hole drilling and, consequently, blasting can result in sub-optimal size distributions for maximum crusher throughput leading to increased dilution and ore loss. Conversely, under-blasting can create large blocks of material resulting in lower productivity and increasing maintenance costs of heavy earth moving equipment.

The applicant has carried out a drill automation program. Automating drilling activities have led to a number of advantages including providing a safer operating environment for a drill operator ("driller"), producing a more stable hole with a more accurate hole collar position, more accurate hole depths and angles, greater productivity and a longer rotary bit life.

The applicant believes that further benefits can be obtained by controlling a plurality of drills simultaneously. Such an initiative presents other challenges to be overcome.

While the above discussion references automating drills, it will be appreciated that the technology is applicable, with the resultant advantages, to controlling other vehicles involved in mining operations. For ease of reference, the disclosure will describe the application of the technology to its use on automated drills but the scope of the disclosure extends to other vehicles which are able to be controlled in an automated manner. In this specification, unless the context clearly indicates otherwise, the term "vehicle" is to be understood in a broad sense to include any suitable mobile machine. In addition, the term "automated" (and related forms of the word) is to be understood to include an autonomous mode of operation and a remote control mode of operation.

SUMMARY

In a first aspect, there is provided a system for controlling operation of a vehicle in a defined area, the system including
 a perimeter defining a boundary of the defined area;
 a user interface for at least one of controlling and monitoring movement of the vehicle as it traverses the area and monitoring the location of the vehicle relative to the perimeter; and
 a controller in communication with the user interface and to which the vehicle is responsive, the vehicle having a plurality of modes of operation, one of which is an autonomous mode and another of which is an operator controlled mode, and the controller being operative, when the vehicle is operating in the autonomous mode and the vehicle comes within a predetermined range of the perimeter, to inhibit the vehicle from crossing the perimeter and, when the vehicle is operating in the operator controlled mode or is converted from autonomous mode to operator controlled mode, to permit the vehicle to cross the perimeter under control of the operator.

The "predetermined range" may include touching the perimeter so that the vehicle is unable to cross over the perimeter. The vehicle may be a mobile drilling machine and may, particularly but not necessarily exclusively, be a drilling machine operable to drill blast holes in a bench of an open cut mine. The defined area may therefore be a surface area of the bench of the mine being drilled.

The user interface may be remotely located relative to the defined area and the operator controlled mode of operation may be a remote control mode of operation, the vehicle being controlled by the operator located at, and using, the user interface.

The user interface may include an operator console and at least one display screen. The at least one display screen may be a haptic display responsive to touch commands from an operator.

The perimeter may be displayed as a perimeter indicator overlying the defined area on the at least one display screen. The perimeter indicator may have different characteristics depending on which part of the boundary of the area the perimeter indicator is demarcating. Thus, for example, the perimeter indicator may be displayed in different colours with those colours highlighting a danger of crossing the perimeter (when the vehicle is operating in remote control mode). An edge of the bench may be represented by a colour signifying danger (such as red) whereas a border between the bench on which the vehicle is operating and a neighbouring bench or a roadway may be demarcated in a different colour signifying lower or no risk of crossing the perimeter.

The perimeter may be implemented as a virtual perimeter which is surveyed after preparation of the defined area, the virtual perimeter being entered into the controller after having been surveyed.

In a second aspect, there is provided a method of controlling operation of a vehicle in a defined area, the vehicle having a plurality of modes of operation, the method including
 monitoring a position of the vehicle relative to a perimeter defining a boundary of the defined area; and
 when the vehicle is operating in an autonomous mode of operation and the vehicle comes within a predetermined range of the perimeter disabling the vehicle to inhibit the vehicle from crossing the perimeter and, when the vehicle is operating in an operator controlled mode or is converted from autonomous mode to operator controlled mode, permitting the vehicle to cross the perimeter under control of the operator.

The method may include implementing the perimeter as a virtual perimeter and storing it in a controller of the vehicle.

The method may include generating a discernible warning when the vehicle crosses the perimeter.

The method may include providing a user interface including at least one display screen and displaying the perimeter as a perimeter indicator overlying the area on the at least one display screen. The user interface may be remotely located relative to the defined area and the method may include, when the vehicle is in the operator controlled mode of operation, operating the vehicle in a remote control mode of operation via the user interface.

The method may include displaying the perimeter indicator with different characteristics depending on which part of the boundary of the area the perimeter indicator is demarcating.

In a third aspect, there is provided a system for controlling operation of multiple vehicles, each vehicle having a plurality of modes of operation and each vehicle operating in a defined area having a safety perimeter defining a boundary of the defined area, the system including a controller associated with each vehicle, each controller being configured to control operation of its associated vehicle including a mode of operation of each vehicle; and a user interface in communication with each controller, the user interface being accessible by an operator for enabling the operator at least to monitor movement of each vehicle as it traverses its associated area and to monitor the location of each vehicle relative to the perimeter of its associated area, the user interface further being configured to permit the operator to issue operating instructions to the controller of each vehicle and to assume control of a selected one of the vehicles by converting the vehicle from an autonomous mode of operation to an operator controlled mode of operation.

The controller may be operative, when the vehicle is operating in the autonomous mode and the vehicle comes within a predetermined range of the perimeter, to inhibit the vehicle from crossing the perimeter and, when the vehicle is operating in the operator controlled mode or is converted from autonomous mode to operator controlled mode, to permit the vehicle to cross the perimeter under control of the operator.

The user interface may include an operator console and at least one display screen, the at least one display screen being a haptic display responsive to touch commands from the operator.

The perimeter may be displayed as a virtual perimeter indicator overlying the defined area on the at least one display screen.

The user interface may be configured to enable the operator to switch the selected one of the vehicles back from the operator controlled mode to the autonomous mode when conditions again permit the selected one of the vehicles to operate in autonomous mode.

The user interface may be remotely located relative to the defined area and the operator controlled mode of operation may be a remote control mode of operation, each vehicle being controlled by the operator located at, and using, the user interface.

In a fourth aspect, there is provided a method of controlling operation of multiple vehicles, each vehicle having a controller associated with it, each vehicle having a plurality of modes of operation and each vehicle operating in a defined area having a safety perimeter defining a boundary of the defined area, the method including controlling operation of each vehicle via its controller, including a mode of operation of each vehicle;

enabling an operator at least to monitor movement of each vehicle as it traverses its associated area and to monitor the location of each vehicle relative to the perimeter of its associated area; and permitting the operator to issue operating instructions to the controller of each vehicle and to assume control of a selected one of the vehicles by converting the vehicle from an autonomous mode of operation to an operator controlled mode of operation.

The method may include, when the vehicle is operating in the autonomous mode and the vehicle comes within a predetermined range of the perimeter, inhibiting the vehicle from crossing the perimeter and, when the vehicle is operating in the operator controlled mode or is converted from autonomous mode to operator controlled mode, permitting the vehicle to cross the perimeter under control of the operator.

The method may include providing a user interface which includes an operator console and at least one display screen, the at least one display screen being a haptic display responsive to touch commands from the operator and in which the method includes displaying the perimeter as a virtual perimeter indicator overlying the defined area on the display screen.

The user interface may be remotely located relative to the defined area and the method may include, when the vehicle is in the operator controlled mode of operation, operating the vehicle in a remote control mode of operation via the user interface.

The method may include enabling the operator to switch the selected one of the vehicles back from the operator controlled mode to the autonomous mode when conditions again permit the selected one of the vehicles to operate in autonomous mode.

In fifth aspect, there is provided a vehicle including a controller configured to be responsive to a safety perimeter defining a boundary of a defined area in which the vehicle is operable, the vehicle having a plurality of modes of operation, one of which is an autonomous mode and another of which is an operator controlled mode, and the controller being operative, when the vehicle is operating in the autonomous mode and the vehicle comes within a predetermined range of the perimeter, to inhibit the vehicle from crossing the perimeter and, when the vehicle is operating in the operator controlled mode or is converted from autonomous mode to operator controlled mode, to permit the vehicle to cross the perimeter under control of the operator.

In a sixth aspect, there is provided a controller for a vehicle operable in a defined area, the controller being configured to be responsive to a safety perimeter defining a boundary of the defined area, the vehicle having a plurality of modes of operation, one of which is an autonomous mode and another of which is an operator controlled mode, and the controller being operative, when the vehicle is operating in the autonomous mode and the vehicle comes within a predetermined range of the perimeter, to inhibit the vehicle from crossing the perimeter and, when the vehicle is operating in the operator controlled mode or is converted from autonomous mode to operator controlled mode, to permit the vehicle to cross the perimeter under control of the operator.

BRIEF DESCRIPTION OF DRAWINGS

An embodiment of the disclosure is now described by way of example with reference to the accompanying diagrammatic drawings in which.

DETAILED DESCRIPTION OF EXEMPLARY EMBODIMENTS

Figure 1:
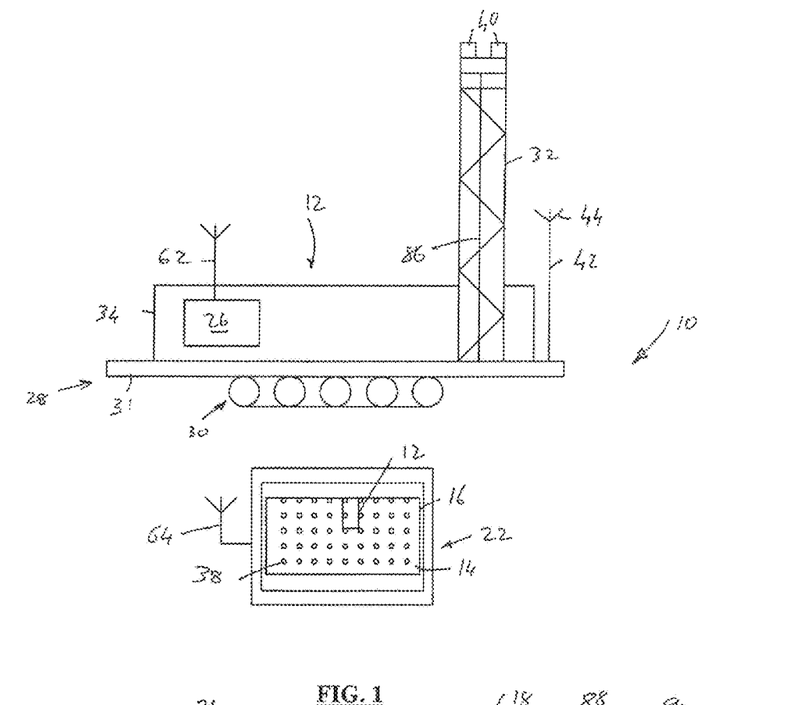
FIG. 1 shows a schematic block diagram of an embodiment of a system for controlling operation of a vehicle in a defined area.

In FIG. 1 of the drawings, reference numeral 10 generally designates a system for controlling operation of a vehicle in a defined area. The system 10 is described below with reference to its application to a vehicle in the form of a mobile mining machine, in particular, a mobile drill 12 operable in a defined area, the defined area being a defined surface area of a drill bench 14 of an open-cut or surface mine. Those skilled in the art will, however, readily appreciate that the system 10 is applicable to any other vehicle or mobile machine and the description with reference to the drill 12 operating on a drill bench 14 is described as a preferred but not exclusive embodiment.

The system 10 includes a perimeter in the form of a virtual safety perimeter (VSP) 16 defining a boundary of the defined area of the drill bench 14.

Figure 2:
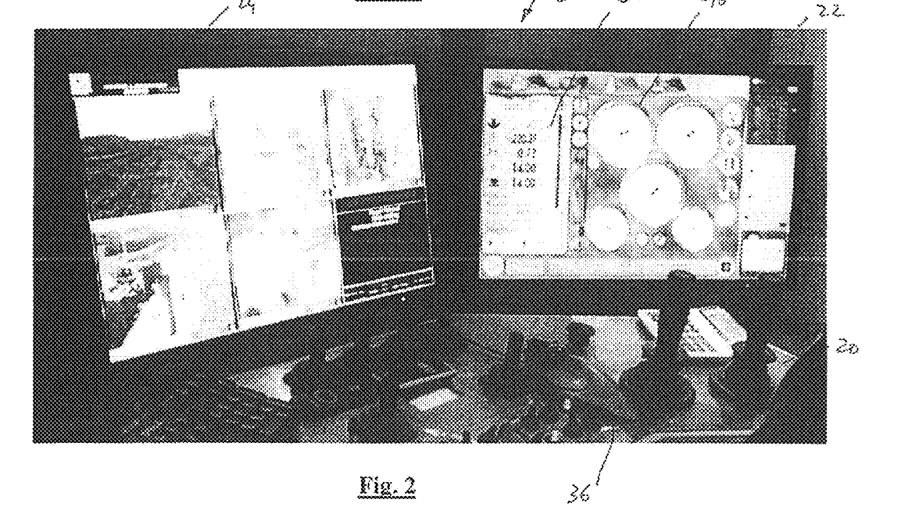
FIG. 2 shows a diagrammatic representation of a user interface of the system.

The system 10 further includes a user interface 18 (FIG. 2). The user interface 18 includes an operator console 20 and a plurality of display screens 22, 24, one of which is shown at 22 in FIG. 1 of the drawings. While only two display screens 22, 24 are shown in FIG. 2, in practice, where multiple drills 12 are to be controlled, more display screens are provided. The operator console 20 mimics the controls of a manual drill which improves useability as a drill operator ("driller") is familiar with the layout and the controls fall readily to hand.

The system 10 also includes a controller 26 to which the drill 12 is responsive and which, in at least one mode of operation of the drill 12, inhibits the drill 12 from either touching or approaching within a predetermined range of the perimeter 16, as will be described in greater detail below.

The drill 12 comprises a wheeled chassis 28 supported on a pair of tracks 30. The chassis 28 comprises a deck 31 supporting a drill mast 32 and a superstructure 34 arranged on the deck 30. The drill 12 is operable in at least two modes of operation, being an operator controlled mode or an autonomous mode. In the operator controlled mode, the drill 12 is operated remotely, i.e. in a remote control mode.

In the remote control mode, the drill 12 is controlled remotely via the drill operator located at the user interface 18 which is remotely located offsite. In the autonomous mode, the drill 12 operates largely without user intervention under the direction of the controller 26. However, when operating in the autonomous mode, it is possible for the driller to override the autonomous mode and convert the drill 12 to the remote control mode of operation.

It is also possible for the drill 12 to operate in a further, operator controlled mode of operation, being a manual mode, where a driller is positioned on the drill 12. In that case, the superstructure 34 may include a cabin (not shown) for the driller. It will, however, be appreciated that if the drill is only to be operated in remote control mode or autonomous mode, the need for such a cabin and associated infrastructure is obviated.

The system 10 is intended for use in permitting one driller to control multiple drills 12. For this purpose, the user interface 18 includes a plurality of display screens, two of which are shown at 22 and 24 in FIG. 2 of the drawings. As described above, in practice, more than two display screens 22, 24 are provided depending on the number of drills 12 being controlled, each drill 12 having two display screens 22, 24 associated with it.

At least one of the display screens 22 is a touch screen or haptic display and the driller can control operation of the drill 12 by touching the display screen 22. For example, the driller can mark out a tramming path for the drill 12 or a blast hole drilling sequence by touching the display screen 22. The information is then uploaded to the controller 26 for subsequent use by the controller 26 in controlling movement of the drill 12 on the drill bench 14. In addition, or instead, the user interface 18 can include other pointing devices such as a mouse 36, or the like.

When the driller is controlling multiple drills 12, it is not always possible for the driller to devote complete attention to each of the drills. Hence, it is necessary that movement of the drill 12 in the defined area of each drill bench 14 is controlled so that the drill 12 does not stray outside that area. Hence, the system 10 includes the VSP 16 which defines a boundary of the defined area of the drill bench 14 traversed by the drill 12. In use, as the drill 12 drills blast holes 38 in the drill bench 14, it traverses the bench 14 and, when it comes within a predetermined range of the VSP 16, the controller 26 is operable to disable the drill at least when the drill 12 is operating in its autonomous mode so that the drill 12 does not breach the VSP 16. The controller 26 disables the drill 12 by placing the drill 12 in an idling mode.

The "predetermined range" referenced above may vary according to circumstances, the condition of the defined area, and various other factors. The "predetermined range" may therefore be any distance from "virtual touching" of the VSP 16 to being within a predetermined distance, for example, about 10 cm to 100 cm of the VSP 16. Examples of suitable ranges are, therefore, about 0 cm-10 cm, 10 cm-20 cm, 20 cm-30 cm, 30 cm-40 cm, 40 cm-50 cm, 50 cm-60 cm, 60 cm-70 cm, 70 cm-80 cm, 80 cm-90 cm and 90 cm-100 cm.

The drill 12 includes GPS devices 40 which determine the position of the drill 12 on the drill bench 14. As illustrated, these GPS devices 40 are, in general, mounted atop the mast 32 and provide good satellite reception. However, the GPS devices 40 are thus susceptible to the drill 12 swaying as it trams over the bench 14 reducing the accuracy of the positional information provided by the GPS devices 40.

Thus, the drill 12 is modified to include a mast 42, lower than the drill mast 32, mounted at a front or rear of the drill 12 which supports a further GPS device 44 in the form of a high precision GPS (HPGPS) device 44. Typically the mast 42 is of a length to position the GPS device 44 approximately 4 m above the surface of the drill bench 14 on which the drill 12 is located. Because this HPGPS device 44 is mounted lower on the deck 30 of the drill 12, it is less susceptible to swaying during tramming. This, coupled with the higher update rate of the HPGPS device, produces a better signal which improves the accuracy of the positional information of the drill 12. This enables higher tramming speeds to be achieved and results in improved productivity.

To ensure that the drill 12 does not breach the VSP 16, the VSP 16 is programmed into the controller 26 of the drill 12. The VSP 16 is implemented as geographical coordinates which define the position of the VSP 16 on the drill bench 14. The VSP 16 is determined by surveying the bench 14 after bench preparation.

Thus, by using the data relating to the VSP 16 stored in the controller 26 and positional data from the GPS device 44 and/or the GPS devices 40, it is possible to determine accurately the position of the drill 12 relative to the VSP 16.

Figure 3:
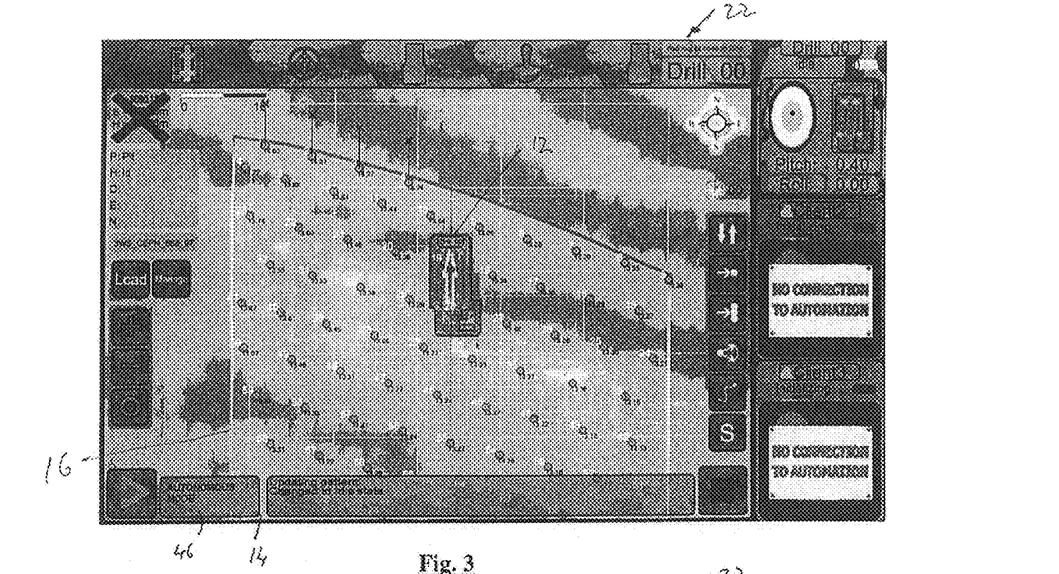
FIG. 3 shows a schematic screen shot of the user interface during a first phase of an autonomous mode of operation of the vehicle.
Figure 4:
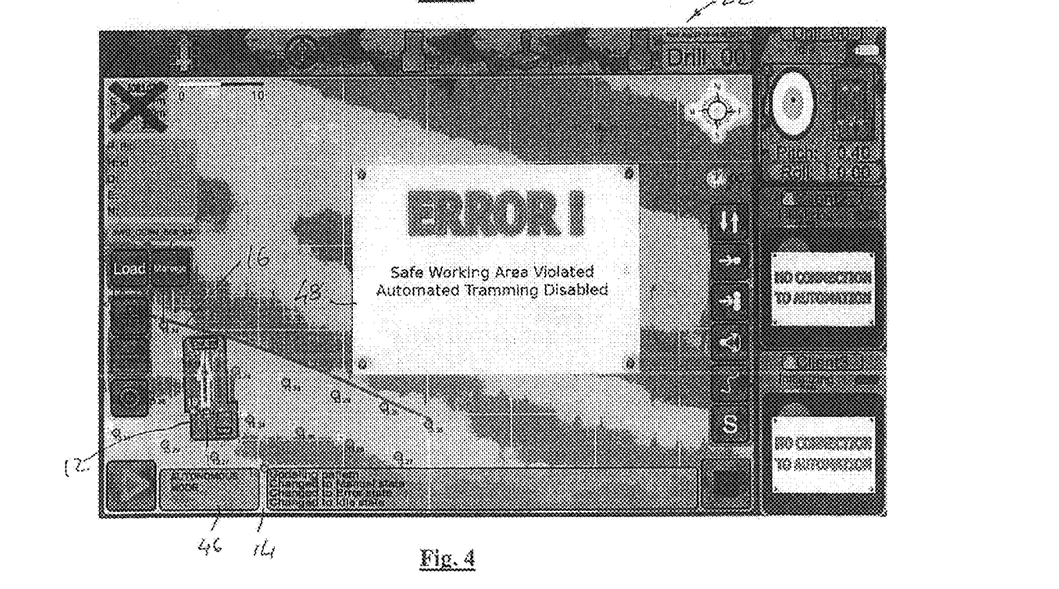
FIG. 4 shows a schematic screen shot of the user interface during a second phase of an autonomous mode of operation of the vehicle.
Figure 5:
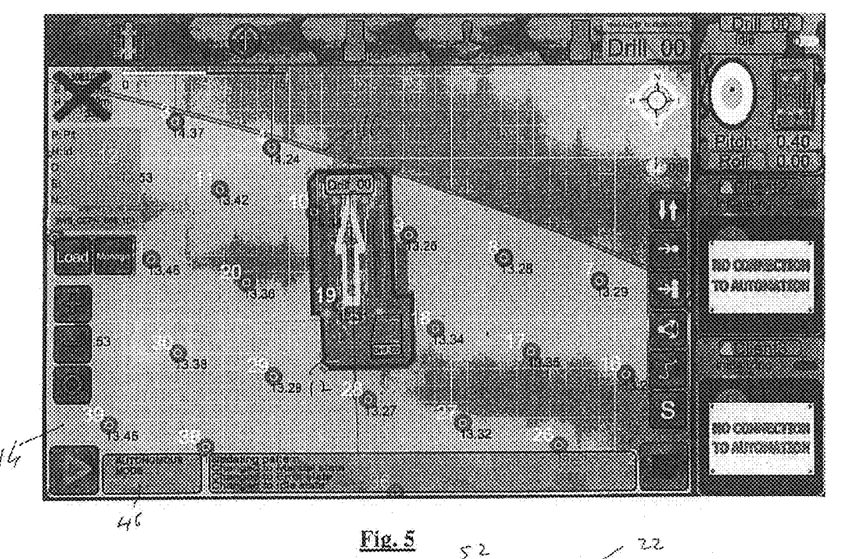
FIG. 5 shows, on an enlarged scale, a part of the screen shot of FIG. 4.

As shown in greater detail in FIG. 3 of the drawings, the position of the drill 12 from the bench relative to the VSP 16 is displayed on the display screen 22. When the drill 12 is operating in autonomous mode, as shown by a field 46 (FIG. 3) on the display screen 22, the position of the drill 12 relative to the VSP 16 is displayed. Provided the drill 12 is within the VSP 16, the drill 12 is able to tram over the drill bench 14 to enable the blast holes 38 to be drilled by the drill 12 in the pre-arranged sequence. If, as shown in FIGS. 4 and 5 of the drawings, any part of the drill 12 comes within the predetermined range of the VSP 16, such as, for example, "touching" the VSP 16, the controller 26 causes the drill 12 to be disabled and places the drill in an idling mode.

An error message 48 (FIG. 4) is displayed on the display screen 22 and may be accompanied by an audible warning. The driller is, therefore, alerted to the fact that the drill 12 has been disabled and is in an idling mode. The driller is able to take remedial action by switching over to remote control mode 12 and maneuvering the drill 12 away from the VSP 16.

In an embodiment, different parts of the VSP 16 have different characteristics, such as, for example, different colours, depending on where that part of the VSP 16 is on the drill bench 14. Where the part of the VSP 16 is positioned relative to a part of the drill bench 14 where crossing the VSP 16 would encounter danger, the VSP 16 may have a characteristic highlighting such a danger.

As an example, the part of the VSP 16 demarcating an edge of the drill bench 14 may be coloured red to highlight where the edge of the drill bench 14 is located. Where crossing the VSP 16 would not have as serious consequences as would tramming over an edge of the drill bench 14, the VSP 16 may have a different colour signifying a lower risk.

Instead of colour being the characteristic, the characteristics of the VSP 16 could adopt other forms, such as lines of different thicknesses, dot-dash lines, or the like.

It will be appreciated that the drill 12 requires maintenance, whether routine or arising due to unforeseen circumstances. In addition, the drill 12 needs to have consumables replenished at regular intervals. For this purpose, the driller is able to convert the mode of operation of the drill 12 to remote control mode. When the drill 12 is operating in remote control mode, it is possible for the driller to cause the drill 12 to cross the VSP 16 as shown, for example, in FIG. 6 of the drawings.

Figure 6:
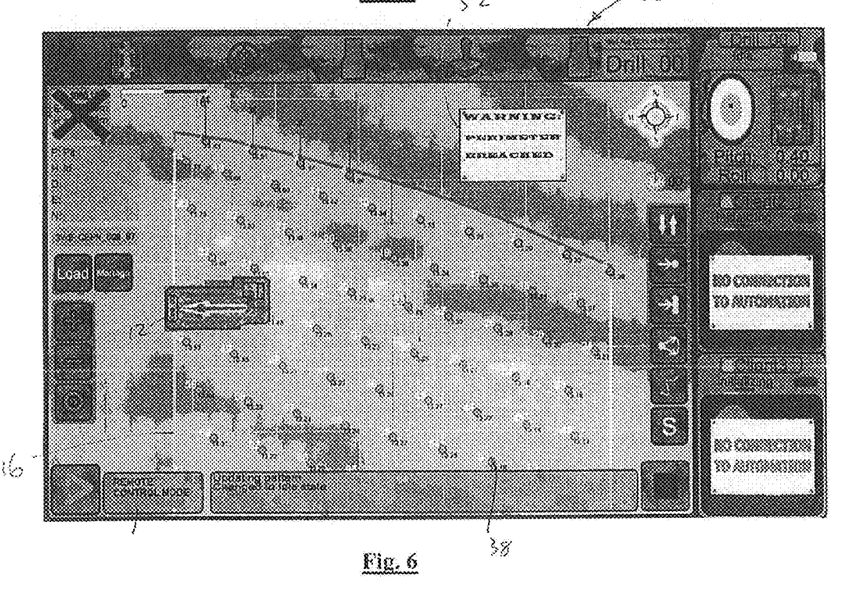
FIG. 6 shows a schematic screen shot of the user interface during a remote control mode of operation of the vehicle.

The fact that the drill 12 is operating in remote control mode is shown in a field 50 displayed on the display screen 22. In addition, when the drill 12 breaches the VSP 16, a message 52 is displayed on the display screen 22 to warn that this has occurred. The message 52 may be accompanied by an audible warning as well to alert the driller to this event. The driller, using the operator console 20, can disable the audible warning if the breaching of the VSP 16 occurred as a result of a deliberate action.

Figure 7:
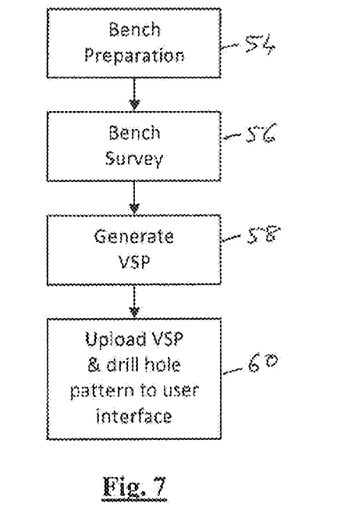
FIG. 7 shows a flow chart of the steps required to generate a perimeter defining a boundary of the defined area in which the vehicle operates.

In use, the system 10 is initially implemented by preparing the drill bench 14 as shown at step 54 in FIG. 7 of the drawings. Once the drill bench 14 has been prepared, it is surveyed as shown at step 56 to enable to the VSP to be generated as shown at step 58. The VSP 16 and drill hole 38 pattern are uploaded to the controller 26 of the drill 12 either directly or via the user interface 18. In this regard, it is noted that the user interface 18 communicates wirelessly with the controller 26 of the drill 12, as shown schematically by antennas 62 and 64.

Once the VSP 16 and the drill hole 38 pattern have been loaded into the controller 26 and the drill 12 is operational, the drill 12 is monitored by the controller 26, when the drill 12 is operating in autonomous mode, to determine the position of the drill 12 relative to the VSP 16. This is shown at step 66 in FIG. 8 of the drawings. The controller 26 determines whether or not the drill 12 is operating in an autonomous mode as shown at step 68. If so, the controller 26 continues to monitor where the drill 12 is in relation to the VSP 16 by using the positional information of the drill 12 as shown at step 70.

Figure 8:
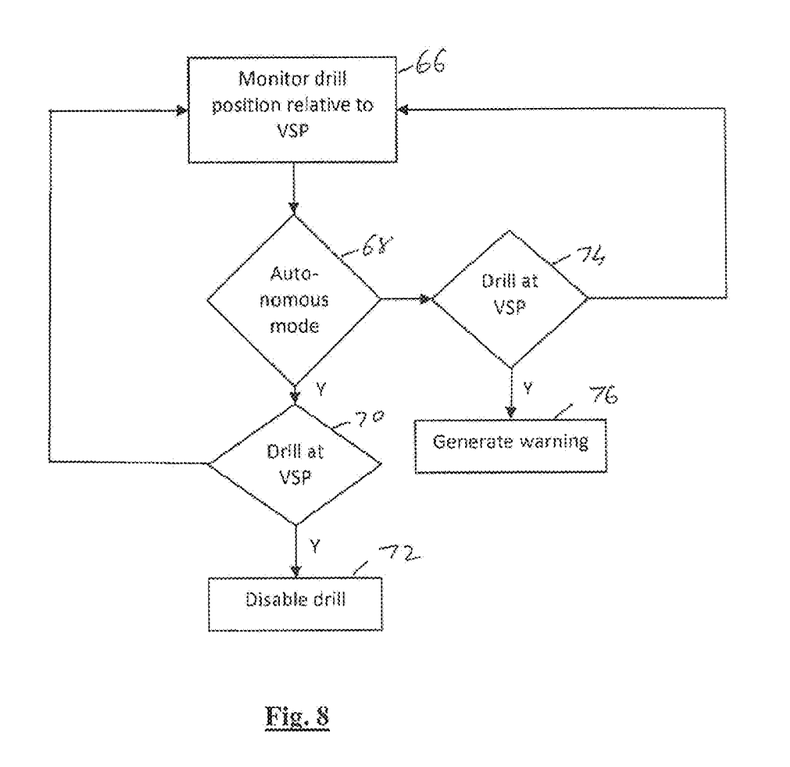
FIG. 8 shows a flow chart of the control of the vehicle using the generated perimeter.

Should the controller 26 determine that the drill 12 is within the predetermined range of the VSP 16 while operating in autonomous mode, the controller 26 is operable to disable the drill 12 as shown at step 72 and places the drill 12 in its idling state.

If the drill 12 is not within the predetermined range of the VSP 16, the controller 26 continues to monitor drill position and permits the drill 12 to tram to enable the following blast hole 38 to be drilled.

Reverting to step 68, if the controller 26 determines that the drill 12 is in remote control mode, it again queries whether the drill 12 is at the VSP 16 as shown at step 74. If not, the controller 26 allows the drill to proceed, continues to monitor drill position and permits tramming of the drill 12.

If the controller 26 determines that the drill is at the VSP 16 but that the drill 12 is operating in a remote control mode, it allows the drill 12 to proceed across the VSP 16 and the warning 52 is generated as shown at step 76.

The provision of the VSP 16 facilitates the task of a driller controlling multiple drills 12. It will be appreciated that these drills 12 could be spaced far from each other on a mine site and, hence be operating in different conditions and be operating at different speeds (both tramming and drilling speeds) etc. The provision of the VSP 16 means that, while the drills 12 are operating in autonomous mode in particular, it is not necessary for the driller to be continuously monitoring the position of the drill 12 on its drill bench 14.

Further, with multiple drills 12 being controlled, if the driller were required to approve a planned tramming path to a selected blast hole 38 on each bench 14, queuing delays could result. With the user interface 18 of the system 10, the driller is able to select several holes at once on each of numerous benches 14. Thus, by selecting the plurality of blast holes 38 to be drilled in one operation, these holes can each be drilled without intervention of the driller.

As indicated above, the drills 12 may be located at numerous locations on the mine site and all need to communicate with the user interface 18. Further, each drill 12 communicates with the user interface 18 wirelessly. Existing wireless networks have insufficient bandwidth available for multi-drill communication. This is exacerbated by topology limitations with drills operating in different parts of the mines simultaneously. As will be described below, part of the data transmitted from each drill 12 comprise visual images which have greater bandwidth requirements.

The system 10 employs automation communication trailers (not shown) placed at specific locations about the mine. The system 10 also employs at least three radios and uses 8.11b/g protocol for communications. The system supports ad hoc mesh networks with nodes on the drills and the automation communication trailers. The nodes on the trailers are connected using a broadband wireless network to the location of the user interface 18, for example, a mine office.

As indicated, part of the data fed to the user interface 18 comprise visual images which are displayed on the display screen 24. In addition, the display screen 24, for example, displays visual images generated by cameras (not shown) mounted on the drill 12. At least six fixed cameras are used to allow the driller to gauge the performance and positional aspects of the drill 12. CCTV pan-tilt zoom cameras are used. Each drill 12 uses four such cameras mounted on the deck 30 and/or mast 32. In addition, two fixed under-deck cameras are used and are placed near a drill string 86 (FIG. 1). These under deck cameras are used during drilling operations to monitor the drilling procedure.

The vision system employed in the system 10 uses high compression and video-on-demand to reduce bandwidth requirements. The frame rate and resolution are able to be configured by the driller via the user interface 18. As indicated above, the system 10 employs a number of display screens 22, 24 to enable data relating to several drills 12 to be displayed at once. For example, as shown on the display screens 22, 24 in FIG. 2 of the drawings, when the drill 12 is undertaking a drilling operation, the drilling data are displayed on the display screen 22 at 88 and a graphical representation of analogue instrumentation of the drill 12 is displayed at 90 on the display screen 22.

To further reduce bandwidth during periods of relatively easy drilling, such as through shale, the video feed to the user interface 18 from the drill 12 is reduced to two cameras, one of which provides a view of the drill deck 30 to monitor vibrations and the other is one of the under deck cameras for monitoring cutting returns to inhibit drill bit bogging in the blast hole being drilled.

Most of the time the drills 12 will be operating in autonomous mode. Because of this, a further benefit of the system 10 is that the need for an operator console 20 for each drill is obviated. Therefore, only a single operator console 20 is provided for multiple drills. A drill section panel is added to the operator console 20. When a particular drill 12 is selected by the driller, the remote control transmitter 64 is connected to the remote control receiver 62 on the drill 12 and a remote control session of that drill 12 is commenced.

The standard practice is to start the drill 12 in remote control and perform a machine check. If this is acceptable, the driller switches the drill 12 to autonomous mode via the user interface 18. Further interaction with the drill 12, if any, is effected via the display screen 22. This process is repeated until all drills 12 being controlled by that user interface 18 are operational.

When it is necessary for the driller to convert the drill 12 from autonomous mode to remote control mode, the relevant drill 12 is selected by the driller via the operator console 20 and the drill 12 is switched to remote control mode via a remote control switch on the operator console 20. This procedure is seamless as the drill is switched to idle between modes.

The system 10 further employs an independent shut down using a programmable logic controller (PLC) with an Ethernet gateway. This independent shut down allows multiple locations to activate the system to shut down multiple drills 12 simultaneously. The independent shut down is activated either by loss of communication heartbeat for a certain period of time between the drills 12 and the user interface 18 or by active initiation by the driller via the user interface 18. The independent shut down records how shut down was carried out and why for later analysis.

As described, most of the data relating to the drill are displayed on the display screen 22, including status and key performance indicators which are displayed in smaller windows (not shown). It is possible to select one of the drills 12 to bring up a higher level of detail in a large window on the relevant display screen 22, 24. This is normally done during path planning and blast hole 38 selection or when drilling difficult ground. It is possible to have all the vision systems of three drills on one large display screen such as a twenty four inch screen. However, if only two drills 12 are being controlled, the driller may prefer to have a screen for each drill 12.

Previously, when a drill 12 has been remotely controlled, and autonomous operation of the drill 12 is interrupted, the system required the driller to complete the function in remote control mode. With the present system 10, the driller can switch back seamlessly at any stage to autonomous mode using the user interface 18 and the drill 12 will complete the function in autonomous mode. This is of particular benefit when drilling in difficult ground, where the drill may be constantly bogging or when levelling on very uneven ground.

A further improvement made with the system is that levelling of the drill 12 has been improved and this has resulted in increased reliability. In certain situations where the super structure 34 includes a cabin, and the cabin is downhill on a sloping surface, levelling may prove difficult as the drill 12 is on the limit of its operating curve to lift the extra weight.

As is known, percussion drilling requires finer control than rotary drilling. Automating the drills 12 results in improvements relating percussion drilling. Other features added include anti-bogging control and the ability to move the drill rod up and down the hole via the display screen 22. The ability to move the rod up and down helps to clear cuttings caught behind the drill bit and can be done using the display screen 22 rather than the operator console 20.

In addition to the benefits of automating drilling operations, the ability to control multiple drills 12 simultaneously provides further benefits including: allowing a single operator to control multiple drills 12, maintaining production during driller absenteeism, reducing the training time to follow site drilling standards, increasing the availability of drills, increasing the mean time between failures, improving blast outcomes, and ensuring all sensors are maintained which aids rock recognition. In addition, drill automation generally causes less stress on the drill mast 32 and chassis 28 of the drill 12.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for controlling operation of a vehicle in a defined area, the system including
   a perimeter defining an outer boundary of the defined area;
   a user interface for at least one of controlling and monitoring movement of the vehicle as it traverses the area and monitoring the location of the vehicle relative to the perimeter; and
   a controller in communication with the user interface and to which the vehicle is responsive, the vehicle having a plurality of modes of operation, one of which is an autonomous mode and another of which is an operator controlled mode, and the controller being operative, when the vehicle is operating in the autonomous mode and the vehicle comes within a predetermined range of the perimeter, to cease autonomous mode operation to inhibit the vehicle from crossing the perimeter and to notify an operator that the operator is to assume operator controlled mode of operation to move the vehicle out of the predetermined range of the perimeter, which action includes at least one of maneuvering the vehicle, while within the defined area, away from the perimeter and crossing the perimeter under control of the operator, the user interface being configured to enable the operator to cause the controller to switch the vehicle back from the operator controlled mode to the autonomous mode when conditions again permit the vehicle to operate in autonomous mode.

2. The system of claim 1 in which the user interface is remotely located relative to the defined area and in which the operator controlled mode of operation is a remote control mode of operation, the vehicle being controlled by the operator located at, and using, the user interface.

3. The system of claim 1 in which the user interface includes an operator console and at least one display screen.

4. The system of claim 3 in which the at least one display screen is a haptic display responsive to touch commands from an operator.

5. The system of claim 3 in which the perimeter is displayed as a perimeter indicator overlying the defined area on the at least one display screen.

6. The system of claim 5 in which the perimeter indicator has different characteristics depending on which part of the boundary of the area the perimeter indicator is demarcating.

7. The system of claim 1 in which the perimeter is implemented as a virtual perimeter which is surveyed after preparation of the defined area, the virtual perimeter being entered into the controller after having been surveyed.

8. A method of controlling operation of a vehicle in a defined area, the vehicle having a plurality of modes of operation, the method including
monitoring a position of the vehicle relative to a perimeter defining an outer boundary of the defined area; and
when the vehicle is operating in an autonomous mode of operation and the vehicle comes within a predetermined range of the perimeter disabling the vehicle by ceasing autonomous mode operation to inhibit the vehicle from crossing the perimeter and notifying an operator that the operator is to assume operator controlled mode of operation to move the vehicle out of the predetermined range of the perimeter, which action includes at least one of maneuvering the vehicle, while within the defined area, away from the perimeter and crossing the perimeter under control of an operator and causing the controller to switch the vehicle back from the operator controlled mode to the autonomous mode when conditions again permit the vehicle to operate in autonomous mode.

9. The method of claim 8 in which the user interface is remotely located relative to the defined area and in which the method includes, when the vehicle is in the operator controlled mode of operation, operating the vehicle in a remote control mode of operation via the user interface.

10. The method of claim 8 which includes displaying the perimeter indicator with different characteristics depending on which part of the boundary of the area the perimeter indicator is demarcating.

11. The method of claim 8 which includes providing a user interface including at least one display screen and displaying the perimeter as a perimeter indicator overlying the area on the at least one display screen.

12. The method of claim 11 which includes implementing the perimeter as a virtual perimeter and storing it in a controller of the vehicle.

13. The method of claim 11 which includes generating a discernible warning when the vehicle crosses the perimeter.

14. A system for controlling operation of multiple vehicles, each vehicle having a plurality of modes of operation, including an autonomous mode of operation and an operator controlled mode of operation, and each vehicle operating in a defined area having a safety perimeter defining an outer boundary of the defined area, the system including
a controller associated with each vehicle, each controller being configured to control operation of its associated vehicle including a mode of operation of each vehicle, the controller being operative to cause its associated vehicle to cease autonomous mode of operation when that vehicle comes within a predetermined range of the perimeter of the defined area; and
a user interface in communication with each controller, the user interface being accessible by an operator for enabling the operator at least to monitor movement of each vehicle as it traverses its associated area and to monitor the location of each vehicle relative to the perimeter of its associated area, the user interface further being configured, when a selected one of the vehicles comes within the predetermined range of the perimeter, to notify the operator that the selected one of the vehicles has ceased autonomous mode of operation to permit the operator to issue operating instructions to the controller of the selected one of the vehicles to convert the selected one of the vehicles to an operator controlled mode of operation, which operating instructions includes at least one of maneuvering the selected one of the vehicles under control of the operator, while within the defined area, away from the perimeter and permitting the selected one of the vehicles to cross the perimeter under control of the operator, the user interface also being configured to enable the operator to cause the controller to switch the selected one of the vehicles back from the operator controlled mode to the autonomous mode when vehicle operating conditions again permit the selected one of the vehicles to operate in autonomous mode.

15. The system of claim 14 in which the controller is operative, when the vehicle is operating in the autonomous mode and the vehicle comes within a predetermined range of the perimeter, to inhibit the vehicle from crossing the perimeter.

16. The system of claim 14 in which the user interface includes an operator console and at least one display screen, the at least one display screen being a haptic display responsive to touch commands from the operator.

17. The system of claim 16 in which the perimeter is displayed as a virtual perimeter indicator overlying the defined area on the at least one display screen.

18. The system of claim 14 in which the user interface is remotely located relative to the defined area and in which the operator controlled mode of operation is a remote control mode of operation, each vehicle being controlled by the operator located at, and using, the user interface.

19. A method of controlling operation of multiple vehicles, each vehicle having a controller associated with it, each vehicle having a plurality of modes of operation, including an autonomous mode of operation and an operator controlled mode of operation, and each vehicle operating in a defined area having a safety perimeter defining an outer boundary of the defined area, the method including controlling operation of each vehicle via its controller, including a mode of operation of each vehicle, the controller of each vehicle being operative to cause its associated vehicle to cease autonomous mode of operation when that vehicle comes within a predetermined range of the perimeter of the defined area;

enabling an operator at least to monitor movement of each vehicle as it traverses its associated area and to monitor the location of each vehicle relative to the perimeter of its associated area; and when a selected one of the vehicles comes within a predetermined range of the perimeter, notifying the operator that selected one of the vehicles has ceased autonomous mode of operation and permitting the operator to issue operating instructions to the controller of the selected one of the vehicles to convert the vehicles to an operator controlled mode of operation, which operating instructions includes at least one of maneuvering the selected one of the vehicles under control of the operator, while within the defined area, away from the perimeter and permitting the selected one of the vehicles to cross the perimeter under control of the operator, and enabling the operator to cause the controller to switch the selected one of the vehicles back from the operator controlled mode to the autonomous mode when vehicle operating conditions again permit the selected one of the vehicles to operate in autonomous mode.

20. The method of claim 19 which includes, when the vehicle is operating in the autonomous mode and the vehicle comes within a predetermined range of the perimeter, inhibiting the vehicle from crossing the perimeter.

21. The method of claim 19 which includes providing a user interface which includes an operator console and at least one display screen, the at least one display screen being a haptic display responsive to touch commands from the operator and in which the method includes displaying the perimeter as a virtual perimeter indicator overlying the defined area on the display screen.

22. The method of claim 21 in which the user interface is remotely located relative to the defined area and in which the method includes, when the vehicle is in the operator controlled mode of operation, operating the vehicle in a remote control mode of operation via the user interface.

* * * * *